United States Patent
Verstraeten

(10) Patent No.: US 7,191,019 B2
(45) Date of Patent: Mar. 13, 2007

(54) DYNAMIC LINE CONFIGURATION

(75) Inventor: Eddy Verstraeten, Beerse (BE)

(73) Assignee: Markem Corporation, Keene, NH (US)

( * ) Notice: Subject to any disclaimer, the term of this patent is extended or adjusted under 35 U.S.C. 154(b) by 0 days.

(21) Appl. No.: 11/144,381

(22) Filed: Jun. 2, 2005

(65) Prior Publication Data

US 2006/0276921 A1    Dec. 7, 2006

(51) Int. Cl.
*G06F 19/00* (2006.01)
*B60C 25/08* (2006.01)

(52) U.S. Cl. .......................... 700/2; 700/96; 157/1.24; 29/832; 340/572.1

(58) Field of Classification Search ................... 700/2, 700/96; 157/1.24; 29/832, 840; 340/572.1
See application file for complete search history.

(56) References Cited

U.S. PATENT DOCUMENTS

| | | | |
|---|---|---|---|
| 6,128,904 A * | 10/2000 | Rosso et al. | 60/649 |
| 6,145,190 A * | 11/2000 | Shin et al. | 29/840 |
| 6,234,232 B1 * | 5/2001 | Kane et al. | 157/1.24 |
| 6,295,728 B1 * | 10/2001 | Shin et al. | 29/840 |
| 6,349,237 B1 * | 2/2002 | Koren et al. | 700/96 |
| 6,378,200 B1 * | 4/2002 | Lim et al. | 29/832 |
| 6,877,544 B2 * | 4/2005 | Kane et al. | 157/1.24 |
| 7,042,358 B2 * | 5/2006 | Moore | 340/572.1 |
| 2001/0000391 A1 * | 4/2001 | Kane et al. | 157/1.24 |

* cited by examiner

*Primary Examiner*—Leo Picard
*Assistant Examiner*—Douglas S. Lee
(74) *Attorney, Agent, or Firm*—Fish & Richardson P.C.

(57) ABSTRACT

A dynamically-reconfigurable production line includes an item-interaction unit and an item-identification unit configured to read item data from an item approaching the item-interaction unit. On the basis of the item data, a processor accesses a memory to select particular configuration data stored therein provided by the item-identification unit. The processor then causes an actuator to reconfigure the production line consistent with the particular configuration data.

21 Claims, 2 Drawing Sheets

DYNAMIC LINE CONFIGURATION

TECHNICAL FIELD

This invention relates to systems for managing the distribution of manufactured products, and in particular, to production lines.

BACKGROUND

In the course of its distribution, an item often finds itself moving along a production line. As it does so, it encounters item-interaction units. Examples of such item-interaction units include printers or RFID stations for encoding information on the item, or scales that weigh the item, or various mechanical actuators to move the item in particular ways.

A production line typically includes a conveyor belt that transports items past these item-interaction units. As the item approaches an item interaction unit, a sensor detects its arrival. The sensor signals the item-interaction unit, which then waits for a suitable interval to allow the item to reach an optimal interaction position. Once the item reaches that position, the item-interaction unit executes an interaction.

In many cases, a successful interaction with an item requires that the relative locations of the item-interaction unit and the item at the moment of interaction be correct. For example, if the item-interaction unit is a printer, and if a mark is to be printed on the top of a box, the print head should be at the top of the box at the moment of interaction. If the item-interaction unit is a weighing scale, the item should be centered on the scale's platform at the moment of interaction.

Since items can have many different sizes and shapes, the location of an item-interaction unit may have to change from time to time. For example, for tall items, a print-head may have to be moved up; whereas for short items, the print-head may have to be moved down. Without some means for reconfiguration, a production line will therefore accommodate only limited types of items.

In known production lines, such item-specific reconfiguration is a difficult procedure carried out manually at infrequent intervals. Because of the difficulty associated with reconfiguration, such production lines are typically dedicated to one type of item. As a result, production lines lack the flexibility to accommodate many different types of items on an as-needed basis.

SUMMARY

The invention provides a method and apparatus for re-configuring a production line dynamically, in response to changing requirements imposed by different items that may share a single production line.

In one aspect, the invention features a dynamically-reconfigurable production line having an item interaction unit; an item-identification unit configured to read item data from an item approaching the item-interaction unit; a memory for storing configuration data; an actuator for reconfiguring the production line; and a processor for accessing the memory to select particular configuration data on the basis of the item data and causing the actuator to configure the production line consistent with the particular configuration data.

In some embodiments, the memory includes a local memory, a central memory, or any combination thereof.

Other embodiments include those having a network interface.

Various types of actuators can be used. For example, in some embodiments the actuator is configured to cause a shift in a position of an item relative to a position of the item-interaction unit.

A variety of item-interaction units can be used. For example, embodiments of the invention include those in which the item-interaction unit includes a printer, as well as those in which the item-interaction unit includes an RFID programmer.

Similarly, a variety of item-identification units can be used. For example, embodiments, include those in which the item-identification unit is an optical reader, such as a bar-code scanner, or an item counter.

The location of the processor can also be varied. In some embodiments, the processor is local to the production line. In others, the processor is remote from the production line. Other embodiments also include those having a supervising processor for causing the configuration data to be stored in the memory.

In another aspect, the invention features a method for re-configuring a production line by identifying an item on the production line; retrieving configuration data associated with the item; and adaptively reconfiguring the production-line consistent with the configuration data.

Practices of the invention include those in which retrieving configuration data includes accessing a configuration file, those in which retrieving configuration data include accessing locally stored data, and those in which retrieving configuration data includes accessing data over a network.

In some practices of the invention, identifying the item includes reading a bar code associated with the item. However, in other practices, identifying the item includes reading RFID data associated with the item.

In another aspect, the invention features a computer-readable medium having encoded thereon software for causing dynamic reconfiguration of a production line. The software include instructions for identifying an approaching item; retrieving configuration data associated with the approaching item; and reconfiguring the production-line consistent with the data.

The term "production line" is intended to refer to devices that cause relative motion between items and item-interaction units. In some cases, items are conveyed past an item-interaction unit, in other cases, it is the item-interaction units that move and the items that remain stationary.

Production lines need not be restricted to lines used in production, but can also include lines used in connection with distribution and packaging of items. In addition, the term "line" is not intended to be restricted to mean linear. Production lines can traverse paths of various shapes, and may include structures such as carousels and the like.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the accompanying drawings, in which:

DETAILED DESCRIPTION

Figure 1:
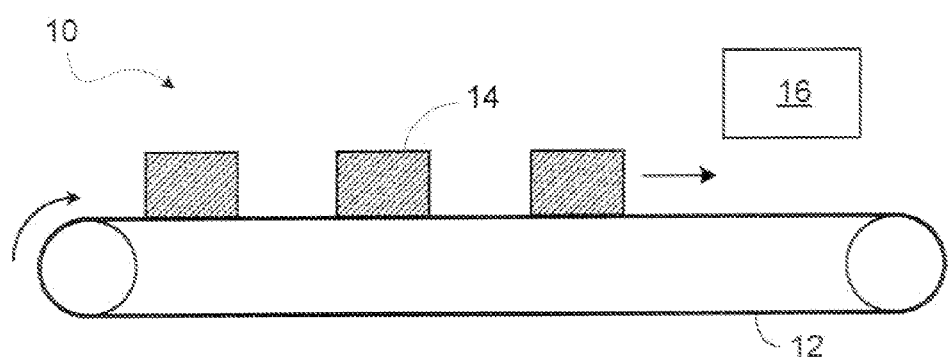
FIG. 1 shows a production line.

Referring to FIG. 1, a dynamically-reconfigurable production line 10 includes a conveyor belt 12 that conveys items 14 in a downstream direction past an item-interaction unit 16.

Figure 2:
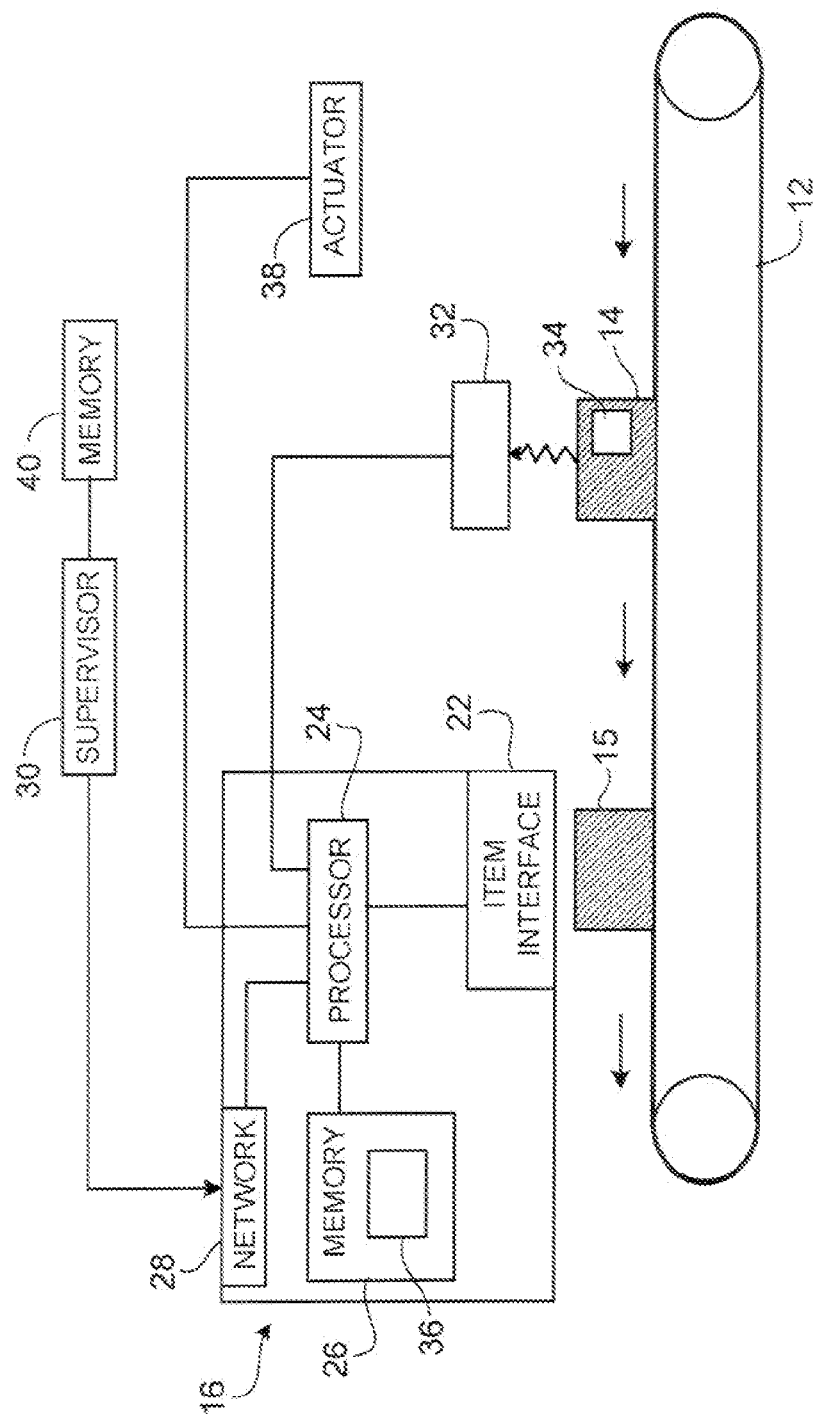
FIG. 2 shows an item-interaction unit from the production line of FIG. 1.

A typical item-interaction unit 16, as shown in FIG. 2, includes an item interface 22 that interacts with an item 14, and a local processor 24 that controls the interaction. The local processor 24 is in communication with a local memory 26 for temporary storage of any interaction data, and with a network interface 28 for communication with a supervising processor 30.

Item-interaction units 16 differ primarily in the nature of their respective item interfaces 22. For example, if the item-interaction unit 16 is intended to mark the item 14, then the item interface 22 may include a printer positioned close to a conveyor belt 12. If the item-interaction unit 16 is intended to weigh the item 14, the item-interaction unit 16 may be a scale. Or, the item-interaction unit 16 may be intended to move the item 14, for example from one conveyor belt 12 to another, or to pick up an item 14 and put it into a box. In this case, the item-interaction unit 16 may include a robotic arm or other mechanical effector. The particular nature of the item-interaction unit 16 depends on details of the production line 10.

An item-identification unit 32 generates, reads, or infers item-identifying data 34 from which the identity of the item 14 can be derived. As used herein, "identity" is not restricted to mean a particular item but can also refer to the type of item. Exemplary item-identification units 32 include bar code scanners, RFID ("Radio Frequency Identification") readers, machine-vision systems, or simply item counters. The identification data can be a serializing code, such as the electronic product code ("EPC"), or a count indexed to a serializing code.

The item-identification unit 32 can include any kind of sensor that reads information from an item 14. Examples include machine vision systems, bar code scanners, or RFID ("Radio Frequency Identification") readers, all of which can be deployed as sensors for communication with the local processor 24. The item-identification unit 32 can also be as simple as an array of electric-eyes that determines the dimensions of the approaching item 14 on the basis of how many electric-eyes are obscured and the spatial location of that item 14, i.e. whether it is to be shifted left or right on the conveyor belt 12, on the basis of which electric-eyes are obscured.

The local processor 24, which is in communication with both the item-interface 22 and the item-identification unit 32, receives the item-identifying data 34 from the item-identification unit 32. The local processor 24 then determines whether the approaching item 14 is of the same type as an item 15 that has just interacted with the item-interaction unit 16.

If the approaching item 14 is of the same type as that item 15, the local processor 24 causes the item-interaction unit 16 to interact with the approaching item 14.

If not, the local processor 24 retrieves, from the local memory 26, a configuration file 36 that includes configuration data associated with a variety of items. The local processor 24 then obtains, from the configuration file 36, configuration data corresponding to the approaching item 14. On the basis of the configuration data, the local processor 24 causes one or more actuators 38 to reconfigure the production line 10, for example by changing the relative position of the item-interaction unit 16 and the conveyor belt 12, so as to place the approaching item 14 in proper spatial relation with the item-interaction unit 16. Alternatively, the local processor 24 can reconfigure the production line 10 by adjusting the characteristics of the item-interaction unit 16.

Actuators 38 suitable for use with the production line 10 include those that move the item interface 22 relative to the conveyor belt 12 and those that move the conveyor belt 12 relative to the item interface 22. Other actuators 38 can adjust the position of the item 14 as it approaches the item interface 22. Examples of such actuators 38 include bars or rods that push or pull the item into a desired position. The actuator 38 may also be a speed governor that controls the rate at which the conveyor belt 12 conveys items 14 past the item interface 22.

Typical item-interaction units 16 include printers, such as ink jet printers or thermal printers. The term "printer" is intended to encompass all devices that mark items 14. In many cases, the item interface 22 is a print-head. For example, a printer can be one that embosses an item 14, or one that encodes data onto an RFID tag associated with the item 14.

The local processor 24 uses item-identifying data 34 from the item-identification unit 32 to retrieve, from the configuration file 36, configuration data corresponding to the approaching item 14. That configuration data is then used to dynamically reconfigure some aspect of the production line 10 to facilitate interaction between the approaching item 14 and the item-interaction unit 16.

The term "item" includes more than individual product units as sold at the retail level. The "item" being marked might be a box containing several retail units, or a palette containing several such boxes. The term "item" can thus refer to a consumer unit, a distribution unit, or a palette unit.

The supervising processor 30 can periodically download the configuration file 36 to the local memory 26 through the network interface 28. Alternatively, the local processor 24 can obtain configuration data from a configuration file 36 stored in a central memory 40, thereby eliminating the need to maintain a local copy of the configuration file 36.

The dynamically reconfigurable production line 10 as described herein can thus accommodate items 14 of various types on an as-needed basis. In such a production line 10, items 14 need not be placed at precise locations on the production line 10 for the item-interaction to take place correctly. Instead, the production line 10 dynamically reconfigures itself, either by shifting the item 14 appropriately, or by changing some other aspect of the production line 10 to accommodate the item 14. In addition, such a production line 10 can easily be switched to accommodate different types of items 14 even without having to be shut down for reconfiguration. To do so, the production line 10 identifies what type of item 14 is approaching, determines the optimal configuration associated with that item 14, and reconfigures itself accordingly.

The invention claimed is:

1. A dynamically-reconfigurable production line comprising
   an item interaction unit;
   an item-identification unit configured to read item data from an item approaching the item interaction unit before the item reaches the item interaction unit;

a memory for storing configuration data;
an actuator for reconfiguring the production line; and
a processor for accessing the memory to select particular configuration data on the basis of the item data and causing the actuator to reconfigure the production line consistent with the particular configuration data.

2. The production line of claim 1, wherein the memory comprises a local memory.

3. The production line of claim 1, further comprising a network interface in communication with the processor.

4. The production line of claim 1, wherein the actuator is configured to cause a shift in a position of an item relative to a position of the item-interaction unit.

5. The production line of claim 1, wherein the item-interaction unit comprises a printer.

6. The production line of claim 1, wherein the item-interaction unit comprises an RFID programmer.

7. The production line of claim 1, wherein the processor is local to the production line.

8. The production line of claim 1, wherein the processor is remote from the production line.

9. The production line of claim 1, further comprising a supervising processor for causing the configuration data to be stored in the memory.

10. The production line of claim 1, further comprising a central memory from which the processor retrieves the configuration data.

11. The production line of claim 1, wherein the item-identification unit comprises an optical reader.

12. The production line of claim 1, wherein the item-identification unit comprises a bar-code scanner.

13. The production line of claim 1, wherein the item-identification unit comprises an item counter.

14. A method for re-configuring a production line, the method comprising:
identifying an item on the production line;
determining that the item is of a type that differs from a preceding item on the production line;
retrieving configuration data associated with the item; and
adaptively reconfiguring the production-line consistent with the configuration data.

15. The method of claim 14, wherein retrieving configuration data comprises accessing a configuration file.

16. The method of claim 14, wherein retrieving configuration data comprises accessing locally stored data.

17. The method of claim 14, wherein retrieving configuration data comprises accessing data over a network.

18. The method of claim 14, wherein identifying the item comprises reading a bar code associated with the item.

19. The method of claim 14, wherein identifying the item comprises reading RFID data associated with the item.

20. A computer-readable medium having encoded thereon software for causing dynamic reconfiguration of a production line, the software including instructions for:
identifying an approaching item;
determining that the item is of a type that differs from a preceding item on the production line;
retrieving configuration data associated with the approaching item; and
reconfiguring the production-line consistent with the data.

21. A dynamically-reconfigurable production line comprising
an item interaction unit;
an item-identification unit configured to read item data from an item approaching the item interaction unit;
a memory for storing configuration data;
an actuator for reconfiguring the production line; and
a processor for
determining that the approaching item has a type that is differentl from a type of an item that has previouly interacted with the item interaction unit,
accessing the memory to select particular configuration data on the basis of the item data, and
causing the actuator to reconfigure the production line consistent with the particular configuration data.

* * * * *

UNITED STATES PATENT AND TRADEMARK OFFICE
CERTIFICATE OF CORRECTION

| | | |
|---|---|---|
| PATENT NO. | : 7,191,019 B2 | Page 1 of 1 |
| APPLICATION NO. | : 11/144381 | |
| DATED | : March 13, 2007 | |
| INVENTOR(S) | : Eddy Verstraeten | |

It is certified that error appears in the above-identified patent and that said Letters Patent is hereby corrected as shown below:

On the title page item (56), Under "U.S. Patent Documents" please add the following:

6,125,904   A   10/03/2000   Kane et al.

Signed and Sealed this

Twenty-second Day of December, 2009

David J. Kappos
*Director of the United States Patent and Trademark Office*